(12) United States Patent
Wu et al.

(10) Patent No.: US 11,090,909 B2
(45) Date of Patent: Aug. 17, 2021

(54) FORMING METAL COMPOSITES

(71) Applicant: HEWLETT-PACKARD DEVELOPMENT COMPANY, L.P., Houston, TX (US)

(72) Inventors: Kuan-Ting Wu, Taipei (TW); Chien Lung Yang, Taipei (TW); Cheng-Feng Liao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 95 days.

(21) Appl. No.: 15/758,146

(22) PCT Filed: Nov. 4, 2015

(86) PCT No.: PCT/US2015/058995
§ 371 (c)(1),
(2) Date: Mar. 7, 2018

(87) PCT Pub. No.: WO2017/078697
PCT Pub. Date: May 11, 2017

(65) Prior Publication Data
US 2018/0250915 A1    Sep. 6, 2018

(51) Int. Cl.
| | | |
|---|---|---|
| B32B 15/088 | (2006.01) | |
| B32B 15/14 | (2006.01) | |
| B32B 37/10 | (2006.01) | |
| B21D 26/021 | (2011.01) | |
| B21D 26/055 | (2011.01) | |
| B21D 26/059 | (2011.01) | |
| B29C 70/86 | (2006.01) | |
| B32B 7/12 | (2006.01) | |
| B32B 15/082 | (2006.01) | |
| B32B 15/09 | (2006.01) | |
| B32B 15/20 | (2006.01) | |
| B32B 27/28 | (2006.01) | |
| B32B 27/30 | (2006.01) | |
| B32B 27/34 | (2006.01) | |
| B32B 27/36 | (2006.01) | |
| B32B 1/02 | (2006.01) | |
| B32B 3/28 | (2006.01) | |
| B32B 15/08 | (2006.01) | |
| B29C 70/08 | (2006.01) | |
| B32B 38/18 | (2006.01) | |
| B32B 37/12 | (2006.01) | |
| B29K 705/00 | (2006.01) | |

(52) U.S. Cl.
CPC .......... *B32B 15/088* (2013.01); *B21D 26/021* (2013.01); *B21D 26/055* (2013.01); *B21D 26/059* (2013.01); *B29C 70/088* (2013.01); *B29C 70/86* (2013.01); *B32B 1/02* (2013.01); *B32B 3/28* (2013.01); *B32B 7/12* (2013.01); *B32B 15/08* (2013.01); *B32B 15/082* (2013.01); *B32B 15/09* (2013.01); *B32B 15/14* (2013.01); *B32B 15/20* (2013.01); *B32B 27/286* (2013.01); *B32B 27/288* (2013.01); *B32B 27/302* (2013.01); *B32B 27/308* (2013.01); *B32B 27/34* (2013.01); *B32B 27/365* (2013.01); *B32B 37/10* (2013.01); *B29K 2705/00* (2013.01); *B32B 37/12* (2013.01); *B32B 38/1866* (2013.01); *B32B 2037/1223* (2013.01); *B32B 2250/02* (2013.01); *B32B 2250/40* (2013.01); *B32B 2255/06* (2013.01); *B32B 2255/10* (2013.01); *B32B 2255/26* (2013.01); *B32B 2260/021* (2013.01); *B32B 2260/046* (2013.01); *B32B 2262/106* (2013.01); *B32B 2305/22* (2013.01); *B32B 2307/50* (2013.01); *B32B 2309/02* (2013.01); *B32B 2309/12* (2013.01); *B32B 2311/00* (2013.01); *B32B 2311/18* (2013.01); *B32B 2311/24* (2013.01); *B32B 2313/04* (2013.01)

(58) Field of Classification Search
USPC ........................................................ 428/458
See application file for complete search history.

(56) References Cited

U.S. PATENT DOCUMENTS

| | | |
|---|---|---|
| 6,207,089 B1 | 3/2001 | Chuang |
| 6,893,590 B1 | 5/2005 | Rigosi et al. |
| 2010/0151200 A1 | 6/2010 | Naritomi et al. |
| 2011/0165366 A1 | 7/2011 | Wang et al. |
| 2013/0075026 A1 | 3/2013 | Chang et al. |
| 2015/0298404 A1 | 10/2015 | Kondo et al. |

FOREIGN PATENT DOCUMENTS

| | | |
|---|---|---|
| CN | 104797407 | 7/2015 |
| EP | 0155820 A2 | 9/1985 |
| EP | 0496550 A1 | 7/1992 |
| JP | 3570580 | 9/2004 |
| JP | 2013052670 A | 3/2013 |
| WO | WO-2013021719 | 2/2013 |

OTHER PUBLICATIONS

Koganti, R et al, "Carbon Fiber and Super Plastic Aluminum Formed Panel Dicklid Manufacturing Development for the Ford GT", 2004.

Ning, H et al, "Thermoplastic sandwich structure design and manufacturing for the body panel of mass transit vehicle", Sep. 2007.

*Primary Examiner* — Terressa Boykin
(74) *Attorney, Agent, or Firm* — HPI Patent Development

(57) ABSTRACT

Examples of forming metal composites are described herein. In an example, a metal sheet is formed into a predetermined shape using superplastic thermal forming technique. Further, a carbon fiber-reinforced polymer sheet is shaped into the predetermined shape by thermal forming. The metal sheet and the carbon fiber-reinforced polymer sheet are coupled by applying an adhesive between the metal sheet and the carbon fiber-reinforced polymer sheet, to form a metal composite.

15 Claims, 8 Drawing Sheets

FORMING METAL COMPOSITES

BACKGROUND

Aesthetics have made their way into functional design of components. In other words, component design is now a combination of functional design and aesthetics. For example, a body or cover for a device may be provided with an intricate surface shape for aesthetics and may use different materials for achieving the functional aspect of the design. For instance, to provide stiffness, a metal may be used, whereas to provide flexibility and achieve low weight, a polymer may be used. In certain other cases, a combination of both, stiffness as well as low weight, may have to be achieved. Accordingly, in such cases, the polymeric material may be used with metal for manufacturing the components.

BRIEF DESCRIPTION OF FIGURES

The detailed description is provided with reference to the accompanying figures. It should be noted that the description and figures are merely examples of the present subject matter and are not meant to represent the subject matter itself.

DETAILED DESCRIPTION

Figure 1:
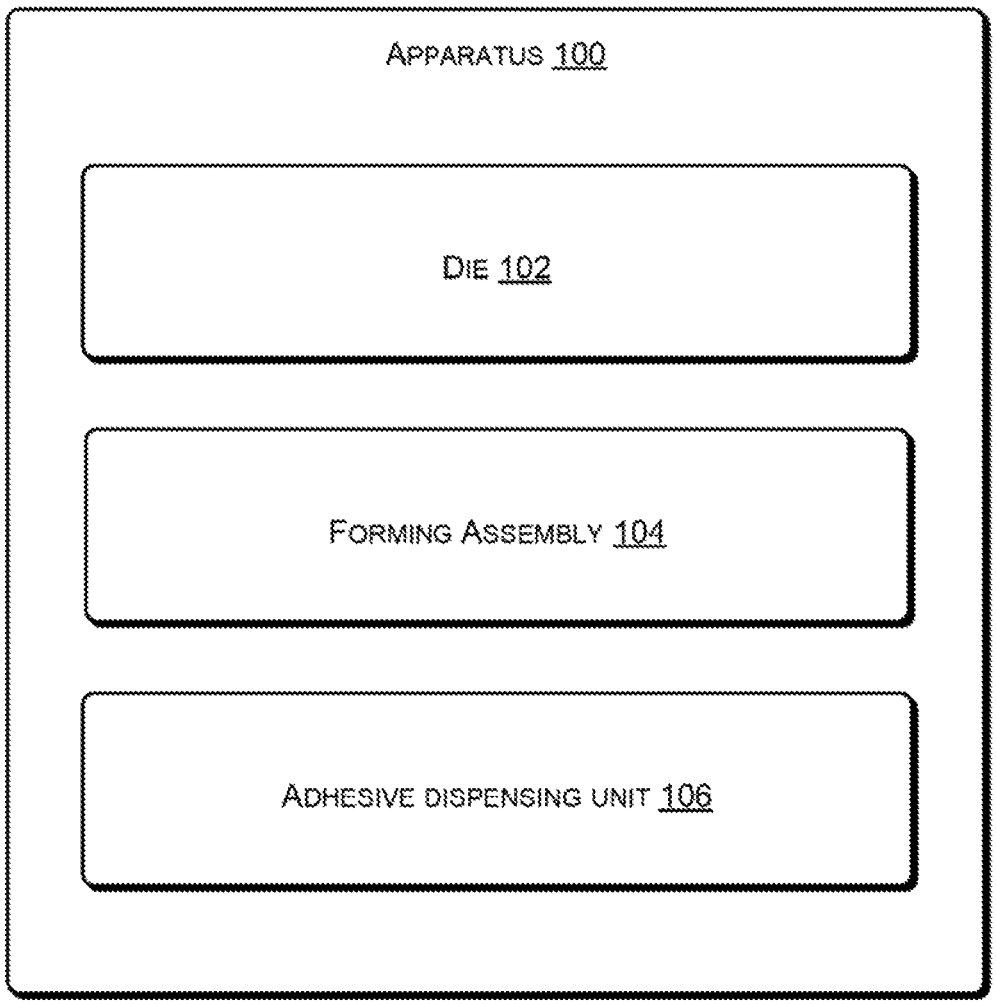
FIG. 1 illustrates a schematic of an apparatus for manufacturing a metal composite, according to an example.

Generally, in order to achieve a combination of various properties, such as stiffness, strength, and flexibility of materials, material composites formed by combining various materials are widely used. One such material composite, simply referred to as composite, which finds a variety of applications, may be a metal and polymer composite.

Such a composite may be formed by using a combination of various processes, such as extrusion and molding. For example, the metal can be either extruded or stamped into a given shape and, thereafter, the polymer can be molded with the metal to form the composite of that shape. However, such processes may involve multiple components for separately forming the metal and the polymer and, then, for forming the composite. Therefore, having the composite made in such a manner may increase tooling cost. Further, the processes of the extrusion and molding, as mentioned in the above example, may involve heating the materials to high temperatures. As a result, cooling of the composite may take a substantial amount of time before further processing. Moreover, achieving intricate shapes with the composite may not be feasible using the above mentioned techniques.

The present subject matter describes aspects of forming a metal composite made of a metal and a carbon fiber-reinforced polymer. In an example, a single apparatus can be used to form the metal composite.

According to an aspect, the metal composite comprises a base structure of a metal sheet. The metal sheet may be heat formed into a predetermined shape. In one example, the forming of the metal sheet may be effected using superplastic thermal forming technique. In such a case, the metal sheet is first heated to a temperature of about 50%-60% of the melting temperature of the metal and then deformed into the predetermined shape by positioning the heated metal sheet on a die and using pressure of a pressurized gas.

Thereafter, an adhesive, such as a molten polymer or a hot-melt polymer, can be applied on the deformed metal sheet. Subsequently, the carbon fiber-reinforced polymer sheet is deformed into the same shape as the metal sheet using thermal forming and bonded with the metal sheet using the adhesive. The thermal forming of the carbon fiber-reinforced polymer sheet is achieved by, first, heating the carbon fiber-reinforced polymer sheet and, then, using pressure of the pressurized gas. Accordingly, the metal composite having the predetermined shape is obtained. In one example, the thermal forming of the carbon fiber-reinforced polymer sheet and the superplastic thermal forming of the metal sheet can be similar processes, carried out at different temperatures owing to different melting points of the carbon fiber-reinforced polymer and the metal.

Since the processing and deforming of the metal sheet and the carbon fiber-reinforced polymer is achieved using the same techniques, i.e., heating and, then, applying pressure of pressurized gas, a single apparatus can be used for processing the metal sheet and the carbon fiber-reinforced polymer for manufacturing the metal composite. Therefore, the manufacturing, according to the present subject matter, is effective in terms of time as well as cost.

In addition, since the metal sheet and the carbon fiber-reinforced polymer are deformed using heat and pressure, the metal sheet and the carbon fiber-reinforced polymer can be deformed into intricate and convoluted shapes with high precision and a good surface finish. As a result, post-processing steps, such as machining and grinding, for achieving good surface finish may be considerably short or may not be performed altogether, further enhancing the cost-effectiveness and time-effectiveness of the manufacturing process.

Further, as mentioned above, the metal composite so formed can exhibit a combination of properties of the metal and the carbon fiber-reinforced polymer. For example, the metal composite has the stiffness of the metal and mechanical strength of the carbon fiber-reinforced polymer. In addition, since neither the metal sheet nor the carbon fiber-reinforced polymer is heated to high temperatures, such as melting temperatures, the metal composite cools considerably quickly. Accordingly, the forming cycle of the metal composite can be considerably short. Therefore, efficiency and throughput of manufacturing the metal composite can be high.

The above aspects are further described in the figures and in associated description below. It should be noted that the description and figures merely illustrate principles of the present subject matter. Therefore, various arrangements that encompass the principles of the present subject matter, although not explicitly described or shown herein, can be devised from the description and are included within its scope. Additionally, the word "coupled" is used throughout for clarity of the description and can include either a direct connection or an indirect connection.

FIG. 1 illustrates a schematic of an apparatus 100 for manufacturing a metal composite, according to an example of the present subject matter. According to an aspect, the apparatus 100 can provide for a single equipment for forming a metal as well as a polymer, and then joining the metal with the polymer to form the metal composite. In addition, the apparatus 100 can provide for achieving convoluted shapes to be formed in a surface of the metal composite so formed.

Accordingly in an example, the apparatus 100 can include a die 102 for positioning a metal sheet and a carbon-fiber reinforced polymer (CFRP) sheet. The metal sheet can be made of a metal or an alloy. The die 102 can have a cavity having a predetermined shape, the predetermined shape being the same shape that the metal composite is to be formed in. For instance, the cavity can be formed as a polygon-shaped recess having tapered walls. In one case, the die 102 can heat the metal sheet and the CFRP sheet before the sheets are deformed. In another case, the die 102 can receive preheated sheets. Further, in an example, first, the metal sheet can be deformed and, subsequently, the CRFP sheet can be deformed and coupled to the metal sheet to form the metal composite.

Accordingly, the apparatus 100 can include a forming assembly 104 to deform the metal sheet and deform the CFRP sheet before coupling the two for forming the metal composite. In addition, the apparatus 100 can include an adhesive dispensing unit 106 for applying an adhesive, such as a molten polymer adhesive, over the deformed metal sheet to fasten the CRFP sheet to the metal sheet. In an example, the adhesive dispensing unit 106 can apply a molten polymer adhesive on the deformed metal sheet. In another example, the adhesive dispensing unit 106 can laminate the CRFP sheet with a layer of the adhesive, such as a hot-melt adhesive. Thereafter, the two sheets, the metal sheet and the CRFP sheet, can be bonded together to form the metal composite.

Figure 2:
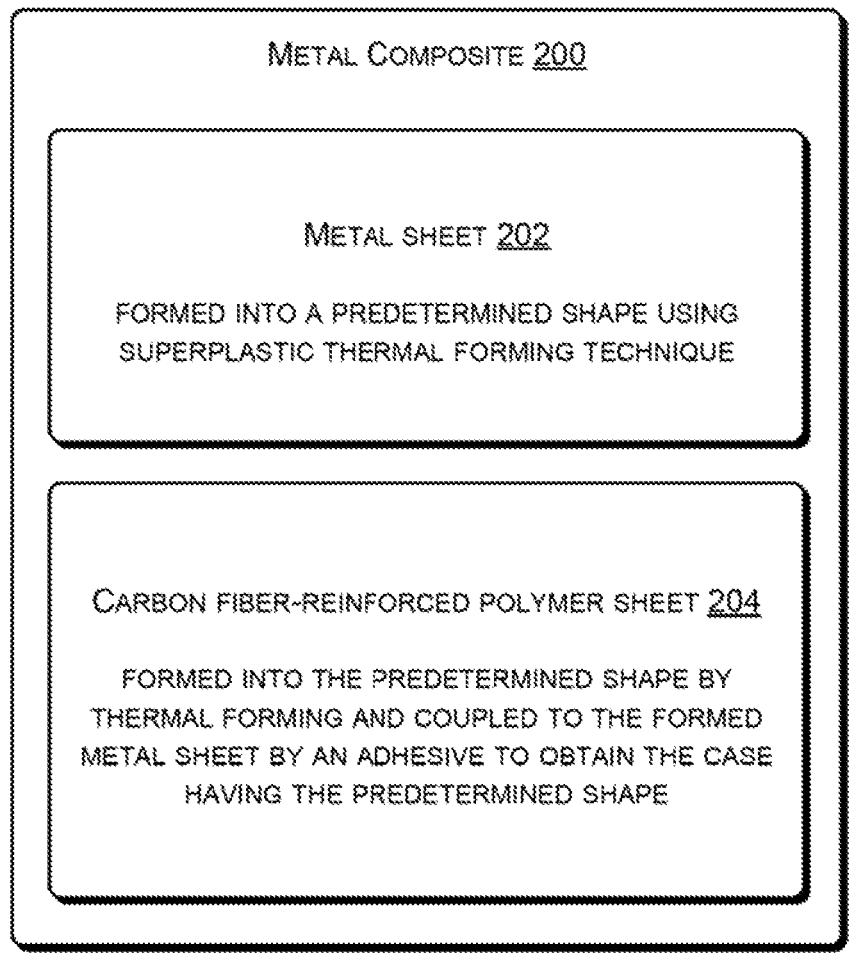
FIG. 2 illustrates a schematic of the metal composite formed using the apparatus, according to an example.

FIG. 2 illustrates a schematic of a metal composite 200 formed using the apparatus 100, according to an example of the present subject matter. According to an example, the metal composite 200 can include a plurality of layers of different materials stacked and bonded together to provide the traits of the different materials to the metal composite 200. In addition, the metal composite 200 is formed in such a manner that the metal composite 200 can be formed in intricate shapes with considerably high surface finish.

According to an aspect, the metal composite 200 can include a metal sheet 202 formed into a predetermined shape using superplastic thermal forming technique. In addition, the metal composite 200 can include a carbon fiber-reinforced polymer (CRFP) sheet 204 coupled to the formed metal sheet 202 by a hot-melt adhesive. In an example, the hot-melt adhesive can be applied on the metal sheet 202 or the CRFP sheet 204, or both. According to the present subject matter, the CFRP sheet 204 is formed into the predetermined shape by thermal forming for coupling to the formed metal sheet 202 to form the metal composite 200 of the predetermined shape.

FIG. 3a to FIG. 3e illustrate cross-sectional views of the apparatus 100 showing various steps in forming the metal composite 200, according to an example.

Figure 3A:
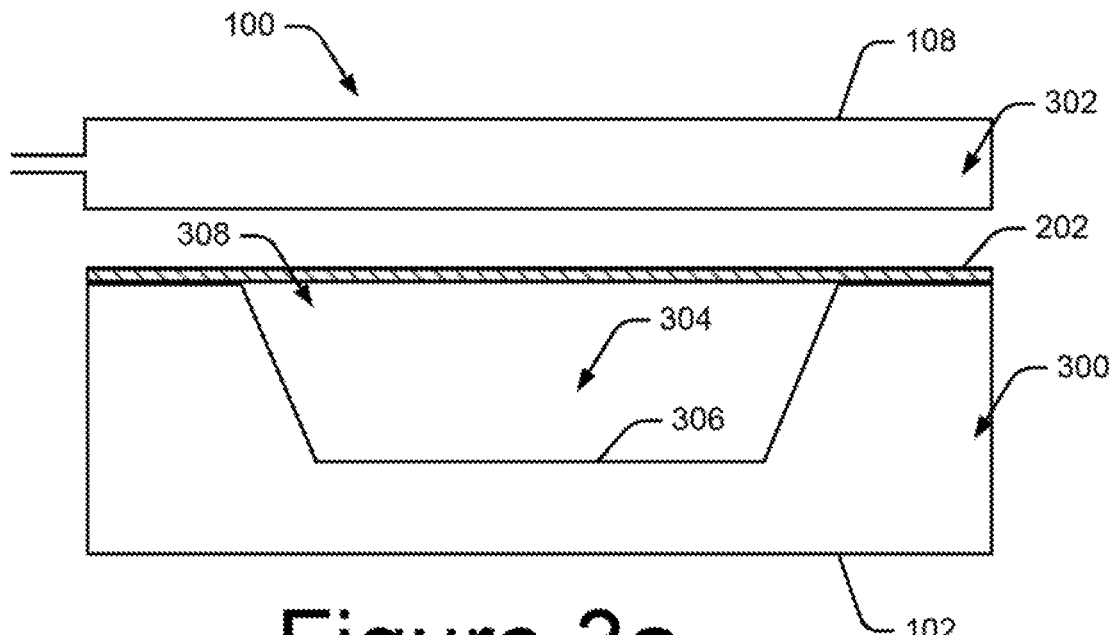
FIG. 3a to FIG. 3e illustrate cross-sectional views of the apparatus showing various steps in forming the metal composite, according to an example.

As is shown in FIG. 3a, the metal sheet 202 is positioned in the apparatus 100. In one example, the apparatus 100 can be formed as having a first segment 300 and a second segment 302, the first segment 300 being separable from the second segment 302. In said example, the first segment 300 can include the die 102, and the second segment 302 can include the forming unit 104 and the adhesive dispensing unit 106. For instance, when positioned in the apparatus 100, the metal sheet 202 can be positioned in the die 102 in the first segment 300.

The die 102 can have a cavity 304, corresponding to the predetermined shape in which the metal composite 200 is to be formed. In an example, the cavity 304 can be formed as being concave, having serrations, being corrugated, having projections, or any other convoluted geometry. For instance, the cavity 304 can be formed as having a larger base 306 than an opening 308. In other words, lateral walls of the cavity 304 can be inclined towards a periphery of the die 200 from the opening 308 to the base 306. Accordingly, the apparatus 100 can be used to manufacture the metal composite 200 having such a convoluted shape.

Figure 3B:
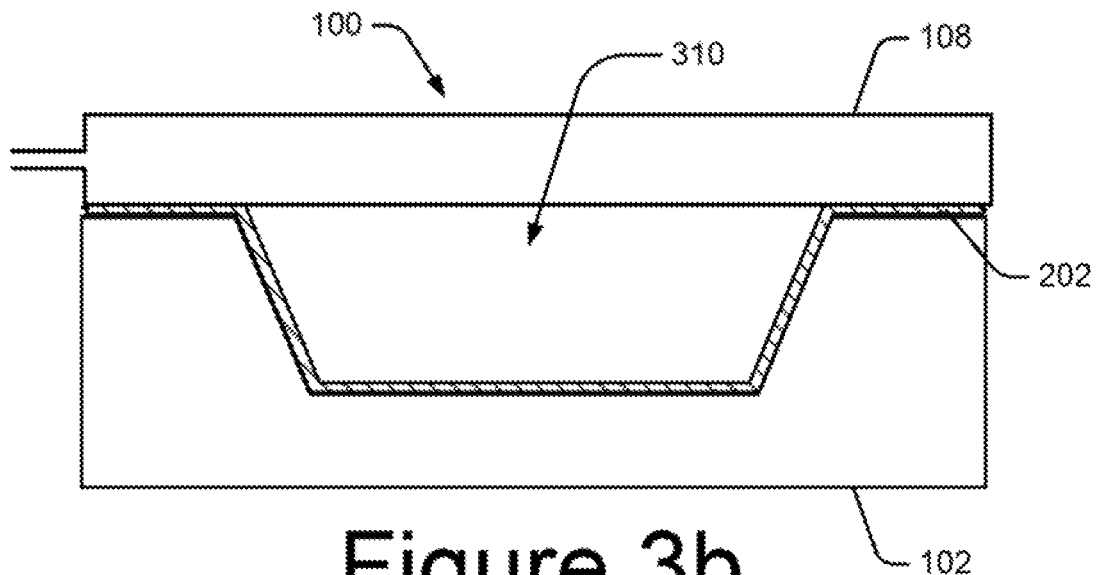

Further, in FIG. 3b, the apparatus 100 is closed, for instance, by positioning the second segment 302 with the first segment 300, and clamping the first segment 300 and the second segment 302. In one example, when the apparatus 100 is closed, a chamber 310 formed inside the apparatus 100 where the metal sheet 202 is positioned becomes substantially leak proof, such that no fluid is allowed to enter or exit the chamber 310. The metal sheet 202 is, thereafter, processed for being formed into the predetermined shape of the cavity 304.

In an example, the metal sheet 202 is deformed by superplastic forming technique. Accordingly, before the metal sheet 202 can be deformed, the metal sheet 202 is heated to a superplastic temperature of the metal. In an example, the superplastic temperature of the metal can be the temperature at which the metal goes into a state that the metal can be deformed beyond a general breaking point. In other words, at the superplastic temperature, the metal can withstand greater stress than usual breaking stress, and instead of fracturing, the metal deforms further. For instance, the superplastic temperature can be about 50% to 60% of the melting temperature of the metal. In one case, the metal sheet 202 can be heated to a temperature of about 350° C. to 600° C. Therefore, in an example, the metal sheet 202 can be formed of a metal exhibiting superplastic behavior. For instance, the metal sheet 202 can be made of aluminum, titanium, or a combination thereof.

In an example, the apparatus 200 can include a heating element (not shown) provided in a vicinity of the die 102 to heat the metal sheet 202 when positioned at the die 102. In another example, however, the metal sheet 202 can be heated before positioning at the die 102.

Further, to deform the heated metal sheet 202, the forming assembly 104 can be operated. For the purposes of deforming the metal sheet 202, the forming assembly 104 can include a pressure chamber to pressurize the gas. The pressurized gas from the pressure chamber is thrust upon the heated metal sheet 202 to deform the metal sheet 202 in the shape of the die 102. For example, the forming assembly 104 can include an applicator to apply the pressure of the pressurized gas on the heated sheet to be deformed. Further, the gas can be air, an inert gas, or a mixture thereof.

Further, the pressure applied on the heated metal sheet by the forming unit 104 can be controlled by controlling an opening of the applicator from which the pressurized gas exits. In an example, the applicator can include a valve provided at the opening of the applicator to control the release of the pressurized gas. In addition, the forming assembly 104 can include a regulator unit operably coupled to the valve of the applicator to regulate the valve, and therefore, the release of the pressurized gas, thereby, controlling the pressure applied by the pressurized gas on the heated sheet. In another example, the regulator unit can control the pressure applied by the pressurized gas by controlling the amount of pressurized gas exiting the pressure chamber.

In an example, a pressure of about 60 kilogram per sq. centimeter ($kg/cm^2$) to 180 $kg/cm^2$ can be applied to the metal sheet 202 to deform the metal sheet 202. To control the pressure applied on the metal sheet 202 by the pressurized gas, the opening of the applicator can be controlled by controlling the valve provided at the opening. In an example, by the regulation of the valve, the pressure of the gas exiting the pressure chamber can be controlled.

Figure 3C:
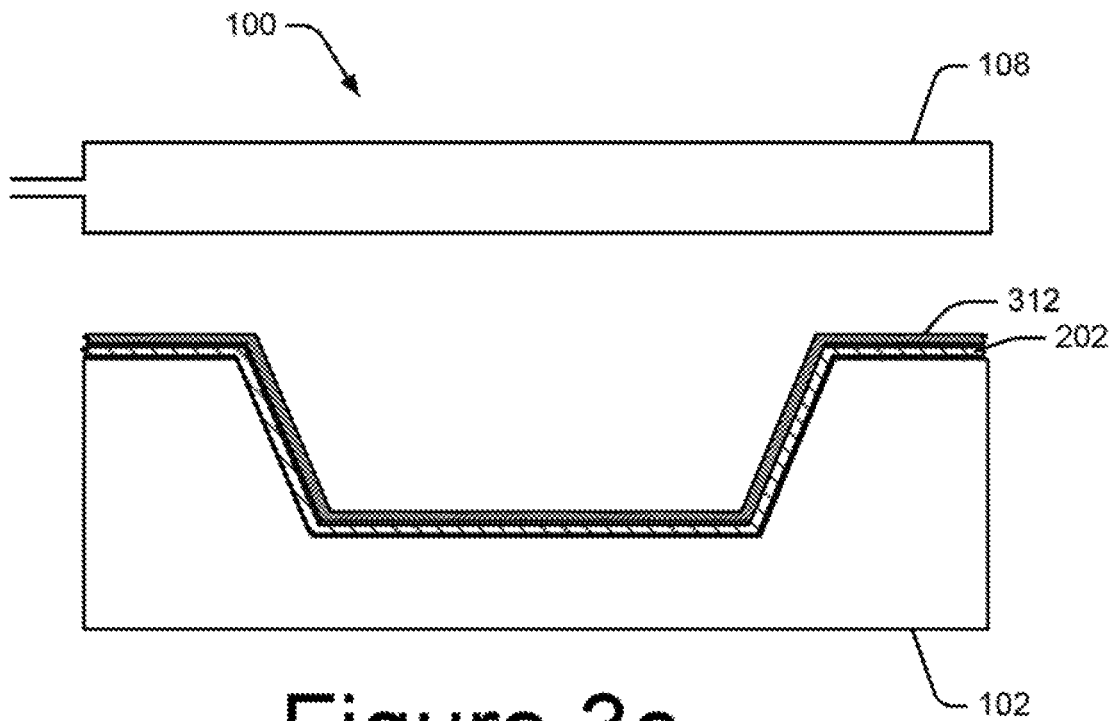

Further, as shown in FIG. 3c, the adhesive dispensing unit 106 can apply a layer of the adhesive 312 on the deformed metal sheet 202. In an example, the adhesive 312 can be a hot-melt adhesive or a molten polymer adhesive. For instance, the molten polymer can be an isocyanate-based polymer, an epoxy-based polymer, an acrylic-based polymer, or a combination thereof. In addition, in one case, the layer of adhesive 312 can be applied throughout the metal sheet 202. In another case, the layer of adhesive 312 can be applied at selected locations, such as along edges of the metal sheet 202.

Figure 3D:
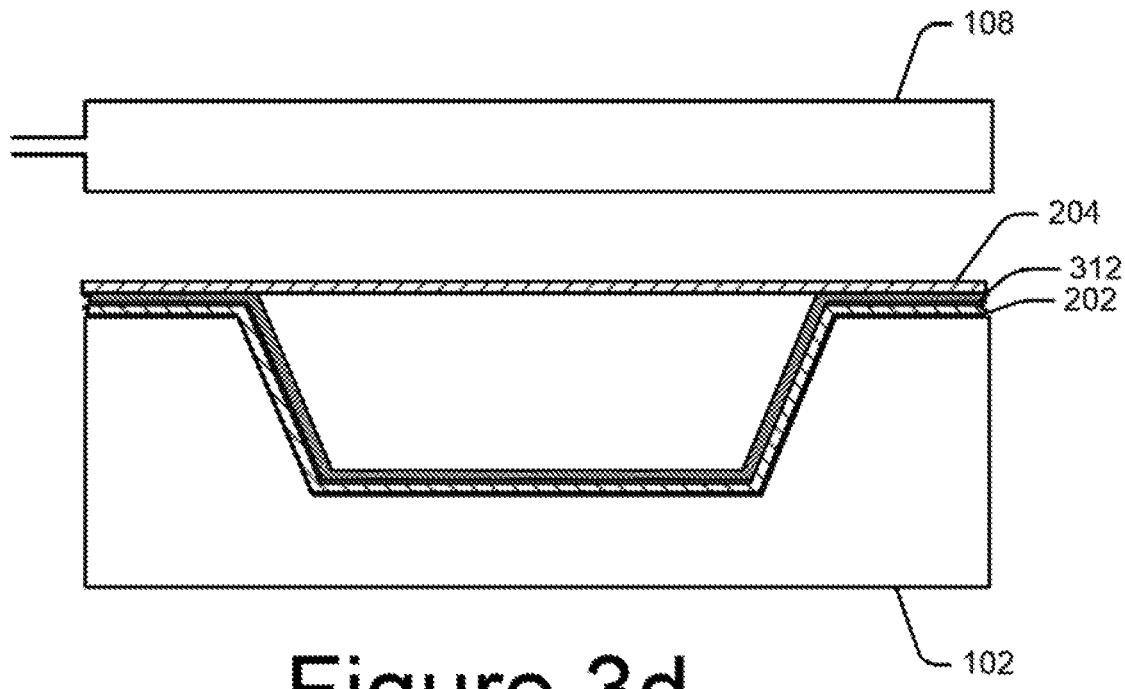
Figure 3E:
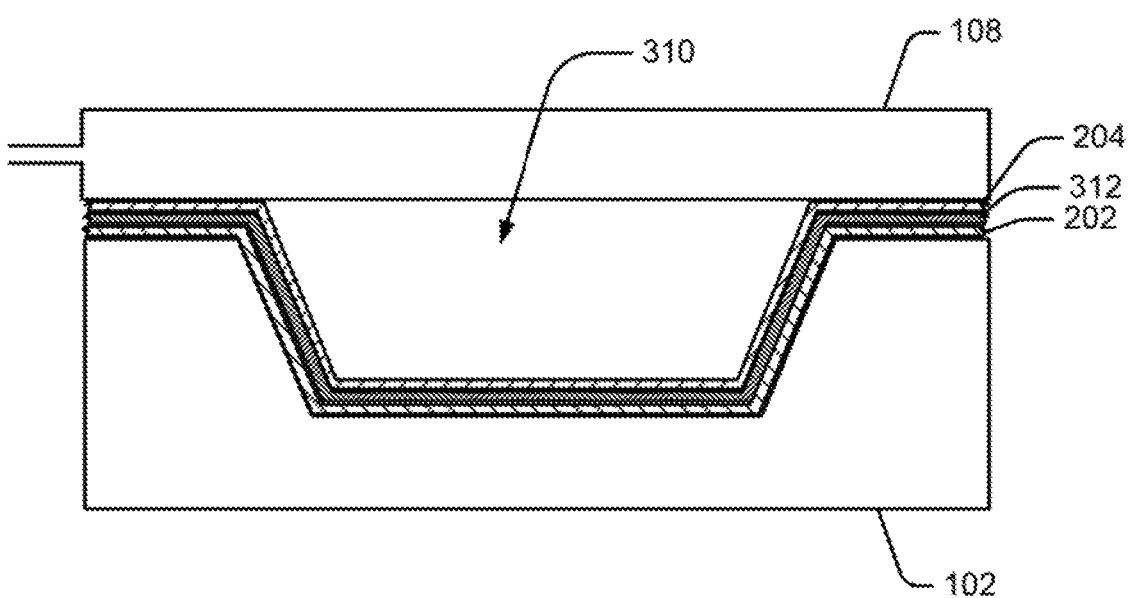

Thereafter, as shown in FIG. 3d, the CRFP sheet 204 can be deformed in the predetermined shape, and coupled to the metal sheet 202 as shown in FIG. 3e. In an example, the CRFP sheet 204 can be formed by impregnating a polymer sheet with a carbon fiber. In an example, the polymer can be a thermoplastic polymer and can be, for instance, an acrylic polymer, a polycarbonate, a styrene polymer, nylon, a polysulfide, a polyketone, or a combination thereof. Further, in an example, the carbon fiber can be a polyacrylonitrile-based carbon fiber, a rayon-based carbon fiber, a pitch-based carbon fiber, a cellulose-based carbon fiber, an aramid-based carbon fiber, or a combination thereof. Such combination of a polymer with a carbon fiber provides flexibility as well as mechanical strength to the CRFP sheet 204.

For deforming the CRFP sheet 204, the CRFP sheet 204 can be heated to a temperature, substantially below the melting point of the CRFP sheet. In an example, the CRFP sheet 204 can be heated to a temperature of about 60° C. to 350° C. Accordingly, the CRFP sheet 204 can be positioned at the die 102 in the first segment 300, above the metal sheet 202 having the adhesive 312 applied on the surface facing the CRFP sheet 204. The second segment 302 can be positioned with the first segment 300 to form the cavity 310 which, as mentioned previously, is substantially leakage proof when formed. The heating element provided in a vicinity of the die 102 can heat the CRFP sheet 204 when positioned at the die 102. In another example, however, the CRFP sheet 204 can be heated before positioning at the die 102.

Subsequently, in the same manner as above, the forming assembly 104 can be operated to deform the CRFP sheet 204. The pressurized gas from the pressure chamber can be supplied to the chamber 310 to exert pressure for shaping the CRFP sheet 204 in the predetermined shape of the metal sheet 202. In an example, the pressurized gas can be used to apply a pressure of about 15 $kg/cm^2$ to 100 $kg/cm^2$ on the CRFP sheet 204 to deform the CRFP sheet 204. The control of the pressure of the gas applied on the heated CRFP sheet 204 is exercised in the same manner as explained above with reference to the forming of the metal sheet 202. In addition, the pressure exerted by the pressurized gas can provide for bonding the CRFP sheet 204 with the metal sheet 202.

In another example, however, the adhesive 312 can be applied on heated CRFP sheet 204 before the CRFP sheet 204 is deformed and bonded to the metal sheet 202. For example, the CRFP sheet 204 can be laminated with a hot-melt polymer adhesive and, then, formed and bonded with the metal sheet 202. For instance, the hot melt-polymer adhesive can be an ethylene-vinyl acetate (EVA) copolymer, a polyamide, a polyolefin, a styrene copolymer, a polyester, a polyurethane, a rubber-based adhesive, or a combination thereof. Therefore, the adhesive 312 is applied between the metal sheet 202 and the CRFP sheet 204, either on the metal sheet 202, the CRFP sheet 204, or both.

Figure 4:
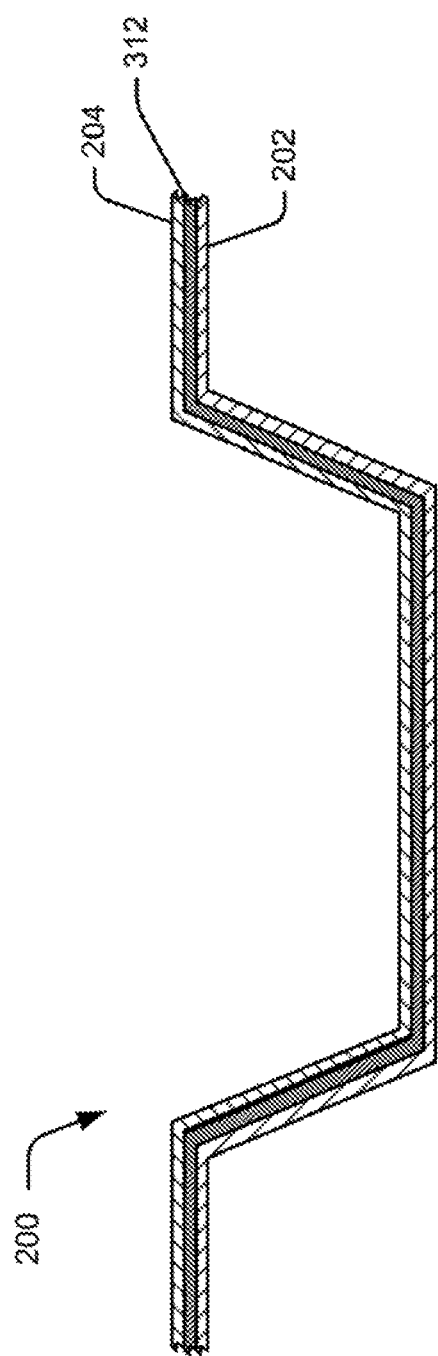
FIG. 4 illustrates a cross-sectional view of the metal composite view of the components of the imaging device, according to an example.

Subsequent to bonding of the metal sheet 202 and the CRFP sheet 204, the metal composite 200 can be obtained. The layered metal composite 200, as obtained from the apparatus 100, is shown in FIG. 4, as an example. While the foregoing description is provided with the metal composite 200 having one layer of the metal sheet 202 and one layer of the CRFP sheet 204, the metal composite 200 may be formed as having a plurality of metal sheets 202 and a plurality of CRFP sheets 204 formed and coupled together in the manner explained above, using the apparatus 100. In such a case, the metal sheets 202 may be made of the same metal or alloy, or of different metals or alloys. Similarly, the CRFP sheets 204 may be made of the same material or different materials.

Figure 5:
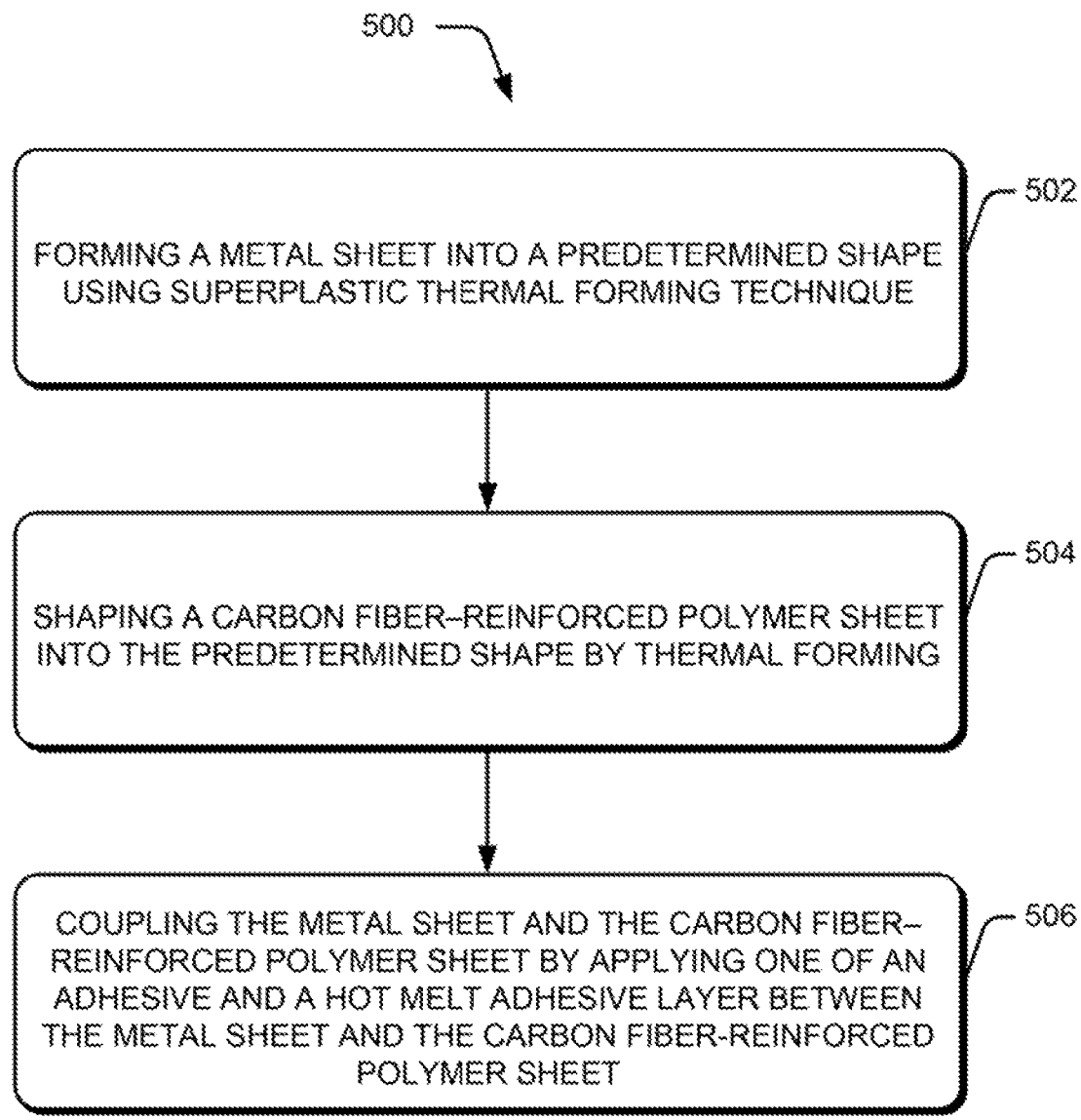
FIG. 5 illustrates a method for manufacturing the metal composite, according to an example.
Figure 6:
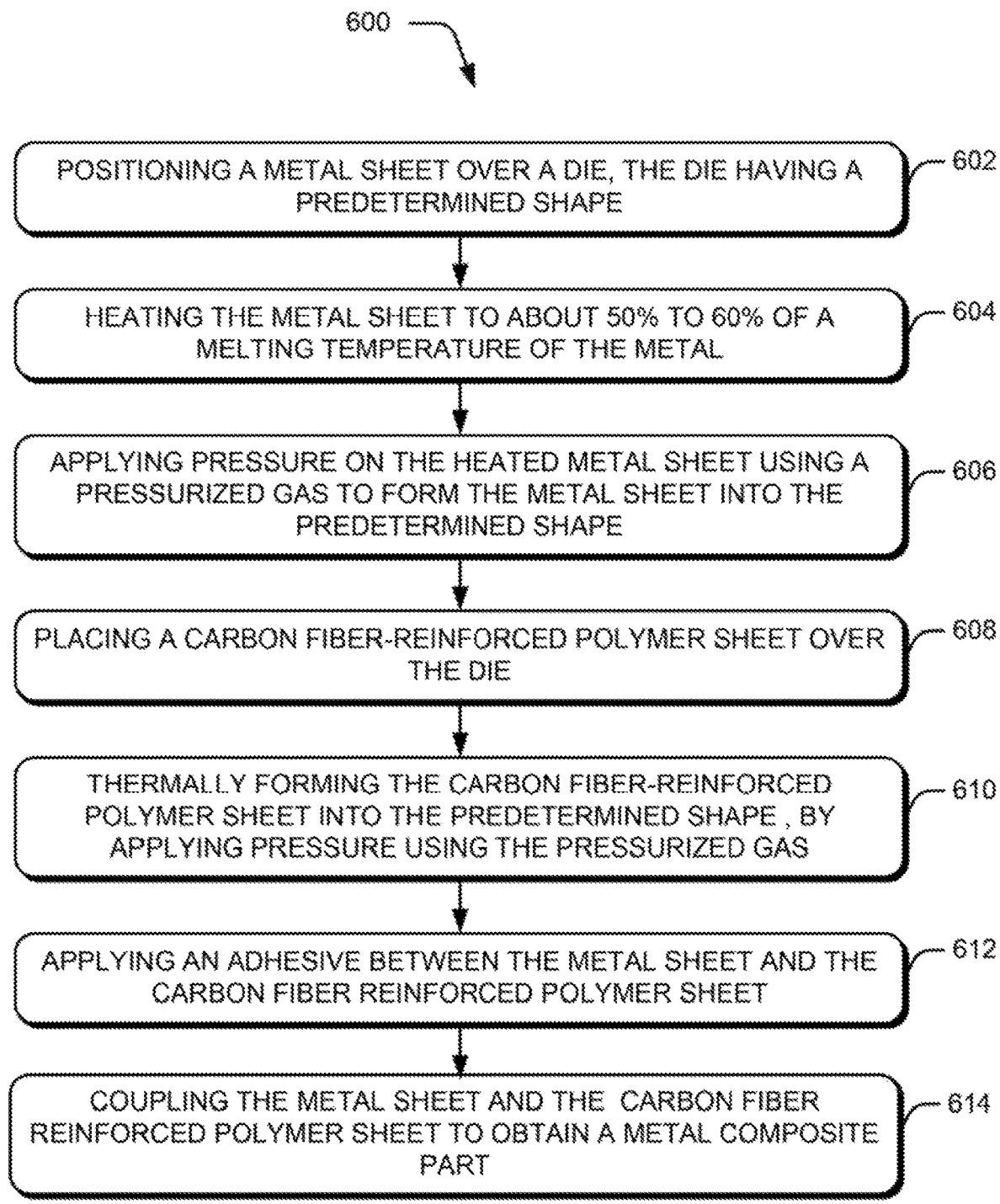
FIG. 6 illustrates a detailed method for manufacturing the metal composite, according to an example.

Methods 500 and 600 described in FIG. 5 and FIG. 6 illustrate a method for manufacturing the metal composite 200, according to an example of the present subject matter. The order in which the methods 500 and 600 are described is not intended to be construed as a limitation, and any number of the described method blocks can be combined in any appropriate order to carry out the methods 500 and 600, or an alternative method. Additionally, individual blocks may be deleted from the methods 500 and 600 without departing from the spirit and scope of the subject matter described herein. The methods 500 and 600 may be performed by an apparatus, such as the apparatus 100

Referring to FIG. 5, at block 502, a metal sheet 202 is formed into a predetermined shape using superplastic thermal forming technique. For example, the metal sheet 202 can be heated to about a superplastic temperature of the metal. For instance, the superplastic temperature of the metal can be the temperature at which the metal goes into a state that the metal can be deformed beyond a general breaking point. In other words, at the superplastic temperature, the metal can withstand greater stress than usual breaking stress, and instead of fracturing, the metal deforms further. In said example, the metal sheet 202 is formed into the predetermined shape by applying pressure of a pressurized gas.

At block 504, a carbon fiber-reinforced polymer (CRFP) sheet 204 is shaped into the predetermined shape by thermal forming. Accordingly, in an example, the CRFP sheet 204 is heated to a temperature substantially below a melting temperature of the CRFP sheet 204 and then formed by applying pressure of the pressurized gas.

At block 506, the metal sheet 202 and the CRFP sheet 204 can be coupled by applying an adhesive 312 between the metal sheet 202 and the CRFP sheet 204, to obtain the metal composite 200. In an example, pressure of the pressurized gas can be used to bond the metal sheet 202 and the CRFP sheet 204 together.

FIG. 6 illustrates a detailed method 600 for forming the metal composite 200, in accordance with an example of the present subject matter.

Referring to block 602, the metal sheet 202 is positioned in the apparatus 100 over a die 102 having a predetermined shape. For example, the die 102 can have the cavity 304 corresponding to the predetermined shape in which the metal composite 200 is to be formed. In an example, the cavity 304 can be formed such that lateral walls of the cavity 304 can be inclined towards a periphery of the die 102 from the opening 308 of the cavity 304 to the base 306. In other words, the cavity 304 can be formed with the opening 308 being narrower than the base of the cavity 304. For instance, the cavity 304 can be formed as being concave, having serrations, being corrugated, having projections, or any other convoluted geometry.

At block 604, the metal sheet 202 is heated to about 50% to 60% of the melting temperature of the metal or alloy that the metal sheet 202 is made of. In other words, the metal sheet 202 is heated to a temperature substantially below the melting temperature so that the metal sheet 202 exhibits superplasticity or superplastic behavior. Accordingly, the metal sheet 202 can be formed of a metal exhibiting superplasticity. For instance, the metal sheet 202 can be made of aluminum, titanium, magnesium, or any such metal, or an alloy thereof.

At block 606, pressure is applied on the heated metal sheet 202 using the pressurized gas, to form the metal sheet 202 into the predetermined shape. In an example, the pressurized gas can be stored in a pressure chamber and is released from to apply the pressure on the heated metal sheet 202. Further, the pressure of the gas exiting the pressure chamber can be controlled to control the pressure applied on the metal sheet 202. In another case, the amount of pressurized gas exiting the pressure chamber can be controlled to control the pressure applied on the metal sheet 202.

At block 608, the CRFP sheet 204 can be positioned over the die 102 for thermal forming into the predetermined shape and bonding with the metal sheet 202.

Accordingly, at block 610, the CRFP sheet 204 can be thermally formed into the predetermined shape, by applying the pressure using the pressurized gas. In an example, the CRFP sheet 204 can be formed by impregnating a polymer sheet, such as a thermoplastic polymer, with a carbon fiber.

Further, in an example, for deforming the CRFP sheet 204, the CRFP sheet 204 can be heated to a temperature, substantially below the melting point of the CRFP sheet. In an example, the heating element in a vicinity of the die 102 can heat the CRFP sheet 204. In another example, however, the CRFP sheet 204 can be heated before positioning at the die 102.

Subsequently, the pressurized gas from the pressure chamber can be supplied to exert pressure on the CRFP sheet 204 and the CRFP sheet 204 can be shaped into the predetermined shape of the metal sheet 202. The control of the pressure of the gas applied on the heated CRFP sheet 204 can be exercised in the same manner as explained above with reference to the forming of the metal sheet 202 at block 606.

At block 612, an adhesive 312 can be applied between the metal sheet 202 and the CRFP sheet 204. In an example, the adhesive 312 can be a molten polymer adhesive and can be applied on the deformed metal sheet 202. In said example, the molten polymer adhesive can be an isocyanate-based polymer, an epoxy, an acrylic, or a combination thereof.

In another example, however, the adhesive 312 can be applied on the heated CRFP sheet 204 before the CRFP sheet 204 is deformed and bonded to the metal sheet 202. For instance, the CRFP sheet 204 can be laminated with a hot-melt polymer adhesive and before being formed. For instance, the hot melt-polymer adhesive can be an ethylene-vinyl acetate (EVA) copolymer, a polyamide, a polyolefin, a styrene copolymer, a polyester, a polyurethane, a rubber-based adhesive, or a combination thereof. In yet another example, the adhesive 312 can be applied on the metal sheet 202 as well as the CRFP sheet 204.

Further, according to an example, the layer of adhesive 312 can be applied throughout the sheets 202, 204. In another example, the layer of adhesive 312 can be applied at selected locations, such as along edges of the sheets 202, 204.

At block 614, the metal sheet 202 and the CRFP sheet 204 can be coupled, by bonding at the surface on which the adhesive 312 is applied, to form the metal composite 200 having the predetermined shape. In an example, the pressurized gas can be used to apply the pressure on the CRFP sheet 204 for bonding with the metal sheet 202. For instance, the metal sheet 202 and the CRFP sheet 204 can be clamped together to allow the bond between the two sheets 202, 204 to strengthen, and subsequently, the clamps can be removed.

Although aspects of forming the metal composite 200 have been described in language specific to structural features and/or methods, it is to be understood that the appended claims are not limited to the specific features or methods described. Rather, the specific features and methods are disclosed as examples for forming the metal composite 200.

We claim:

1. A method comprising:
   forming a metal sheet into a predetermined shape using a superplastic thermal forming technique wherein the superplastic thermal forming technique comprises heating the metal sheet and applying sufficient pressure from a pressurized gas to the heated metal sheet to form the metal sheet into the predetermined shape;
   shaping a carbon fiber-reinforced polymer sheet into the predetermined shape by thermal forming, wherein the thermal forming comprises heating the carbon fiber-reinforced polymer sheet and applying sufficient pressure from a pressurized gas to the heated carbon fiber-reinforced polymer sheet to form the carbon fiber-reinforced polymer sheet into the predetermined shape; and
   coupling, to form a metal composite, the metal sheet and the carbon fiber-reinforced polymer sheet by applying an adhesive between the metal sheet and the carbon fiber-reinforced polymer sheet.

2. The method as claimed in claim 1, wherein the heating the metal sheet comprises:
   heating the metal sheet to a temperature of about 50% to 60% of a melting temperature of the metal.

3. The method as claimed in claim 1, wherein the pressurized gas is one of an inert gas, air, and a mixture thereof.

4. The method as claimed in claim 1, wherein the heating the metal sheet comprises heating the metal sheet to a temperature of about 350° C. to 600° C.

5. The method as claimed in claim 1, wherein the forming the metal sheet comprises applying, using the pressurized gas, a pressure of about 60 kg/cm$^2$ to 180 kg/cm' to the metal sheet.

6. The method as claimed in claim 1, wherein the shaping the carbon fiber-reinforced polymer sheet comprises forming the carbon fiber-reinforced polymer sheet by laminating a polymer sheet with a carbon fiber sheet.

7. The method as claimed in claim 1, wherein the heating the carbon fiber-reinforced polymer sheet comprises heating the carbon fiber-reinforced polymer sheet to a temperature of about 60° C. to 350° C.

8. The method as claimed in claim 1, wherein the shaping the carbon fiber-reinforced polymer sheet comprises exerting, using the pressurized gas, a pressure of about 15 kg/cm² to 100 kg/cm² on the carbon fiber-reinforced polymer sheet.

9. A metal composite comprising:
a metal sheet formed into a predetermined shape using superplastic thermal forming technique; and
a carbon fiber-reinforced polymer sheet coupled to the formed metal sheet by a hot-melt adhesive layer, wherein the carbon fiber-reinforced polymer sheet is formed into the predetermined shape by thermal forming for coupling to the formed metal sheet to obtain the metal composite having the predetermined shape.

10. The metal composite as claimed in claim 9, wherein the metal sheet is one of aluminum, an alloy of aluminum, magnesium, an alloy of magnesium, titanium, an alloy of titanium, and a combination thereof.

11. The metal composite as claimed in claim 9, wherein the carbon fiber-reinforced polymer sheet is formed by impregnating a thermoplastic polymer with a carbon fiber.

12. The metal composite as claimed in claim 11, wherein the thermoplastic polymer is one of an acrylic polymer, a polycarbonate, a styrene polymer, nylon, a polysulfide, a polyketone, and a combination thereof.

13. The metal composite as claimed in claim 11, wherein the carbon fiber is one of a polyacrylonitrile-based carbon fiber, a rayon-based carbon fiber, a pitch-based carbon fiber, a cellulose-based carbon fiber, an aramid-based carbon fiber, and a combination thereof.

14. An apparatus comprising:
a die having a cavity of a predetermined shape corresponding to a shape of a metal composite to be formed, wherein the die is to,
receive a metal sheet to be deformed; and
receive a carbon fiber-reinforced polymer sheet to be deformed and coupled to the metal sheet;
an adhesive dispensing unit to apply an adhesive between the metal sheet and the carbon fiber-reinforced polymer sheet; and
a forming assembly to,
deform the metal sheet using superplastic thermal forming; and
deform the carbon fiber-reinforced polymer sheet using thermal forming, to couple the metal sheet and the carbon fiber-reinforced polymer sheet for forming the metal composite, wherein the forming assembly comprises an applicator to apply pressure of a pressurized gas on the metal sheet and the carbon fiber-reinforced polymer sheet.

15. The apparatus as claimed in claim 14, wherein the forming assembly further comprises:
a pressure chamber to pressurize the pressurized gas;
a valve to control an opening of the applicator; and
a regulator unit to regulate the valve to control the pressure applied by the pressurized gas.

* * * * *